United States Patent [19]

Arencibia, Jr.

[11] Patent Number: 5,840,100

[45] Date of Patent: Nov. 24, 1998

[54] APPARATUS FOR PURIFYING HOT FLUE GAS AND FOR RECEIVING THERMAL ENERGY THEREFROM

[76] Inventor: JoséP. Arencibia, Jr., P.O. Box 401, 3646 Station Ave., Center Valley, Pa. 18034

[21] Appl. No.: 914,597

[22] Filed: Aug. 18, 1997

Related U.S. Application Data

[62] Division of Ser. No. 527,050, Sep. 12, 1995, Pat. No. 5,658,361.

[51] Int. Cl.⁶ .................................................. B01D 47/06
[52] U.S. Cl. ............................ 95/225; 15/316.1; 60/39.5; 95/229; 95/288; 96/251
[58] Field of Search ............................. 96/251, 242, 234, 96/236; 165/95; 55/DIG. 30; 95/223–225, 228, 229, 288; 261/155, 158–161, DIG. 9; 110/215, 216, 345; 122/390–392, 404; 134/166 C; 15/316.1; 60/39.49, 39.5

[56] References Cited

U.S. PATENT DOCUMENTS

| | | | |
|---|---|---|---|
| 1,707,964 | 4/1929 | McKelvy et al. ...................... | 122/1 R |
| 2,547,589 | 4/1951 | Marshall ............................... | 122/7 R |
| 2,702,026 | 2/1955 | Dalin .................................... | 122/7 R |
| 3,504,894 | 4/1970 | Samples et al. ...................... | 110/215 X |
| 3,530,806 | 9/1970 | Bowman ............................... | 110/215 X |
| 4,017,277 | 4/1977 | Van Dyke, Sr. et al. ............. | 261/DIG. 9 |
| 4,031,862 | 6/1977 | Smith .................................... | 122/421 |
| 4,369,834 | 1/1983 | Meunier et al. ...................... | 165/104.16 |
| 4,424,769 | 1/1984 | Charamathieu et al. ............ | 122/391 X |
| 4,487,139 | 12/1984 | Warner ................................. | 110/345 |
| 4,602,677 | 7/1986 | Forster et al. ........................ | 122/392 X |
| 4,624,190 | 11/1986 | Cappi .................................... | 110/215 |
| 4,718,376 | 1/1988 | Leroueil et al. ...................... | 122/390 |
| 4,773,357 | 9/1988 | Scharton et al. ..................... | 165/95 X |
| 4,999,167 | 3/1991 | Skelley et al. ........................ | 422/175 |
| 5,172,653 | 12/1992 | Vadakin ................................ | 15/316.1 X |
| 5,658,361 | 8/1997 | Arencibia, Jr. ....................... | 96/251 |

Primary Examiner—Richard L. Chiesa
Attorney, Agent, or Firm—Ratner & Prestia

[57] ABSTRACT

Particulate-containing hot flue gas flows are flowed into a boiler having a first and a second chamber. The first chamber has a gas side and a water side. The hot flue gas flows into the gas side of the first chamber which is in heat exchange relation with the water side. Steam is generated on the water side and transported to a power generator. Steam or another inert gas is periodically injected into the gas side of the first chamber for removing particulate fouling when the heat exchange relation for the gas side falls below a predetermined minimum level. Cooled flue gas leaving the gas side of the boiler is conducted to a purification chamber having spray nozzles thereby allowing large particulate to settle out of the flue gas and removing fine particulate entrained in the flue gas enabling purified flue gas to be released from an upper portion of the second chamber.

4 Claims, 4 Drawing Sheets

APPARATUS FOR PURIFYING HOT FLUE GAS AND FOR RECEIVING THERMAL ENERGY THEREFROM

This application is a division of U.S. application Ser. No. 08/527,050, filed Sep. 12, 1995, and now U.S. Pat. No. 5,658,361.

FIELD OF THE INVENTION

The present invention relates to the field of recovering thermal energy from hot exhaust gas flows. More particularly, it relates to an apparatus and method for recovering thermal energy from a hot flue gas flow while purifying the gas prior to releasing the cooled flue gas.

BACKGROUND OF THE INVENTION

Hot flue gas leaving most industrial manufacturing facilities carries significant quantities of thermal energy which may be recovered for various applications including heating water for industrial use, or directly feeding flue gas into the tubes of heat exchanger coils or shell and tube elements for use in boilers, economizers and related apparatus. However, most bulk hot flue gas also carries significant quantities of particulate in the form of ash, silt, dust, metal particles and the like. The particulate in most hot combustion gases prevents economical and efficient use of the hot flue gas in heat exchange equipment, because it causes clogging of the equipment and/or reduces the heat transfer coefficient.

Particulate in flue gas typically fouls heat exchange equipment rapidly, requiring use of chemicals and/or significant equipment down-time for removing particulate build-up from heat exchange elements. The build-up of deposits in heat exchange elements resulting from particulate minimizes the available heat exchange area and significantly decreases the heat transfer coefficient of the elements. As a result, such heat exchange equipment must periodically be taken off-line and mechanically cleaned, involving disconnection and cleaning or replacement of heat exchange elements. Most de-fouling methods incur additional operating expenses in the form of man-hours, replacement elements, lost production time and/or the cost of chemical cleaning agents. The need to remove particulate from heat exchange elements typically further entails that such heat exchange equipment cannot be used continuously.

In addition, in many cases, particulate removal incurs further additional capital costs as a result of increased cost involved with baghouse equipment. Most baghouses cannot accept gas at temperatures over about 50° F. As such, the hot flue gas is cooled by blending with large volumes of cool air to transfer the gas to the baghouse. This procedure increases the size of the baghouse piping and equipment to process such large volumes of air, thereby further increasing the capital cost of particulate removal.

There is a need in the art for reducing the temperature of industrial flue gas flows in order to reduce capital operating costs of removal of particulate. Further, there is a need for a continuous method for utilizing the high thermal potential of industrial hot flue gas flows to generate power for use in industrial facilities, which easily and economically removes particulate from heat exchange equipment without incurring unnecessary down-time, additional man-hours or chemical agents. There is also a need for an apparatus for use in a continuous process which fits economically in the available space of most industrial facilities, is easily transportable to industrial facilities having a source of hot flue gas, and which can be used in conjunction with available industrial plant water resources to generate steam to be converted to power for use throughout an industrial facility.

SUMMARY OF THE INVENTION

The invention includes an apparatus for purifying a hot flue gas flow and for recovering energy from a hot flue gas flow including a boiler comprising a first chamber and a second chamber. The first chamber has a gas side and a water side in heat exchange relation. The gas side has an inlet for receiving particulate-containing hot flue gas and an outlet for releasing cooled flue gas. The water side has an outlet for releasing steam formed in the water side. The outlet of the gas side is in fluid communication with an inlet to the second chamber. The second chamber has a first outlet for releasing purified flue gas and a second outlet for removing particulate. The apparatus also includes means for periodically injecting an inert gas into the gas side of the first chamber for removing particulate fouling on the gas side, and a plurality of spray nozzles arranged within the second chamber for mechanically scrubbing the cooled flue gas released from the outlet of the gas side.

The invention further includes a method for purifying and recovering energy from a hot flue gas flow. In the method, particulate-containing hot Flue gas is flowed into a boiler having a gas side and a water side in heat exchange relation. The flue gas in the gas side is cooled, and water in the water side is simultaneously heated to produce steam. The steam is conducted to a power generator. Cooled flue gas is conducted to a purification chamber having spray nozzles for removing fine particulate from the flue gas. The cooled flue gas is mechanically scrubbed in countercurrent flow with water from the spray nozzles. Scrubbed flue gas is removed from an upper portion of the purification chamber, and particulate is removed from a lower portion of the purification chamber. The flow of hot flue gas to the gas side is stopped when the heat exchange relation drops below a predetermined minimum heat exchange capacity due to particulate fouling. An inert gas is injected into the gas side after stopping the flow of hot flue gas to remove the particulate fouling. The injection of inert gas is terminated, and the flow of hot flue gas to the gas side is restarted when the heat exchange relation exceeds a predetermined operating heat exchange capacity.

BRIEF DESCRIPTION OF THE DRAWINGS

The foregoing summary, as well as the following detailed description of preferred embodiments of the invention, will be better understood when read in conjunction with the appended drawings. In the drawings, like numerals are used to indicate like elements throughout. For the purpose of illustrating the invention, there are shown in the drawings an embodiment which is presently preferred. It should be understood, however, that the invention is not limited to the precise arrangements and instrumentalities shown. In the drawings.

DETAILED DESCRIPTION OF PREFERRED EMBODIMENTS

Figure 1:
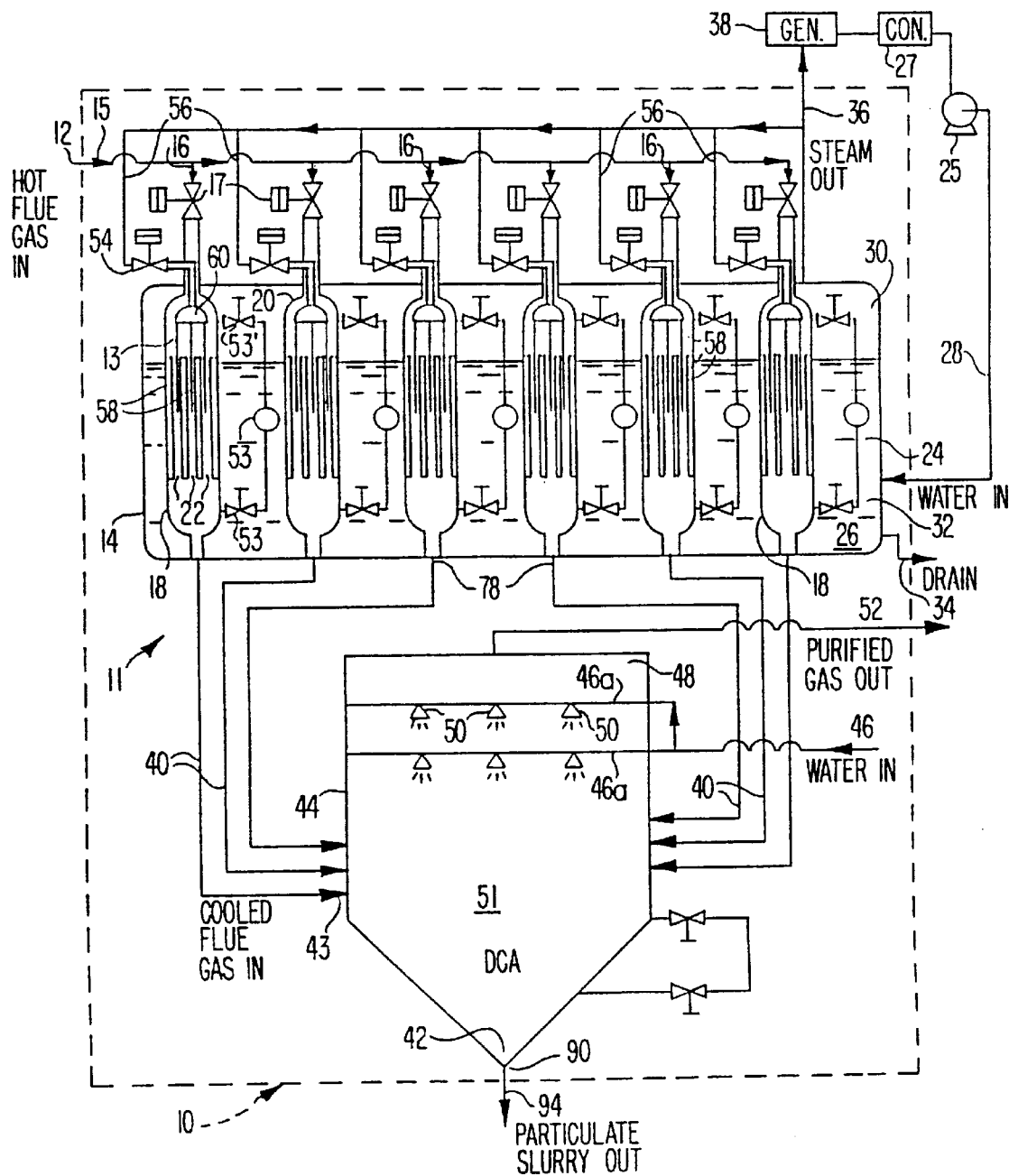
FIG. 1 is a schematic view of a method for recovering energy from a hot flue gas flow according to the present invention.

Certain terminology is used in the following description for convenience only and is not limiting. The words "right," "left," "lower," "upper," "above" and "below" designate directions in the drawings to which reference is made. The terminology includes the words above specifically mentioned, derivatives thereof, and words of similar import.

Referring now to the drawings in detail, there is shown in FIG. 1 a schematic representation of the method and apparatus of the present invention. FIGS. 2–6 show a preferred embodiment of the apparatus, Generally designated as 10, of the present invention. It will be understood from this disclosure that the apparatus 10 may include several boiler configurations, as long as the gas side can be configured to receive both a hot Flue gas flow and an inert gas which can be injected for removing particulate fouling from the gas side, and the water side can be configured to generate steam for releasing to a power generator.

Further, it will be understood from the disclosure, that in the preferred embodiment of the apparatus as shown in FIGS. 2–6, and as described below, the gas side of the boiler may include only one or several heat exchangers and the heat exchangers may have varied numbers of heat exchange tubes. The number of such heat exchangers and the number of tubes within each heat exchanger are a function of the particular heat exchange capacity required for a particular application of the apparatus 10 and the space available for the apparatus 10.

While a boiler having only one heat exchanger uses less space than a boiler having a plurality of heat exchangers, it is preferred to use a plurality of heat exchangers arranged in parallel to minimize the thickness and size of the tube sheet used in connection with the heat exchange tubes. The heat exchangers can be single-tube or multiple-tube units. A single heat exchanger boiler used alone, cannot be operated continuously. If additional heat exchange capacity is required, but available space is limited, more than one boiler having one heat exchanger in non-continuous operation can be employed, or the heat exchangers may be arranged in a vertically stacked configuration. in the situation in which more than one boiler is used, each boiler can be located wherever space permits and connected into a main hot flue gas flow. If multiple, single heat-exchanger boilers are used, the boilers may be alternated such that only one is off-line at any time and the multiple non-continuous boilers can be coordinated to operate in a continuous manner by a central processing unit. This particular arrangement is not preferred as it is less efficient than that of a single (or stacked) boiler unit having at least one heat exchanger within the boiler, as the alternating use of single and separate boilers requires that individual boiler units be shut down, thereby using more energy to start up the individual unit due to thermal inertia. In the preferred embodiment as described below having a single boiler unit with multiple heat exchangers, the boiler itself operates continuously and only individual heat exchangers are taken of-line making the entire boiler more thermally efficient.

Figure 2:
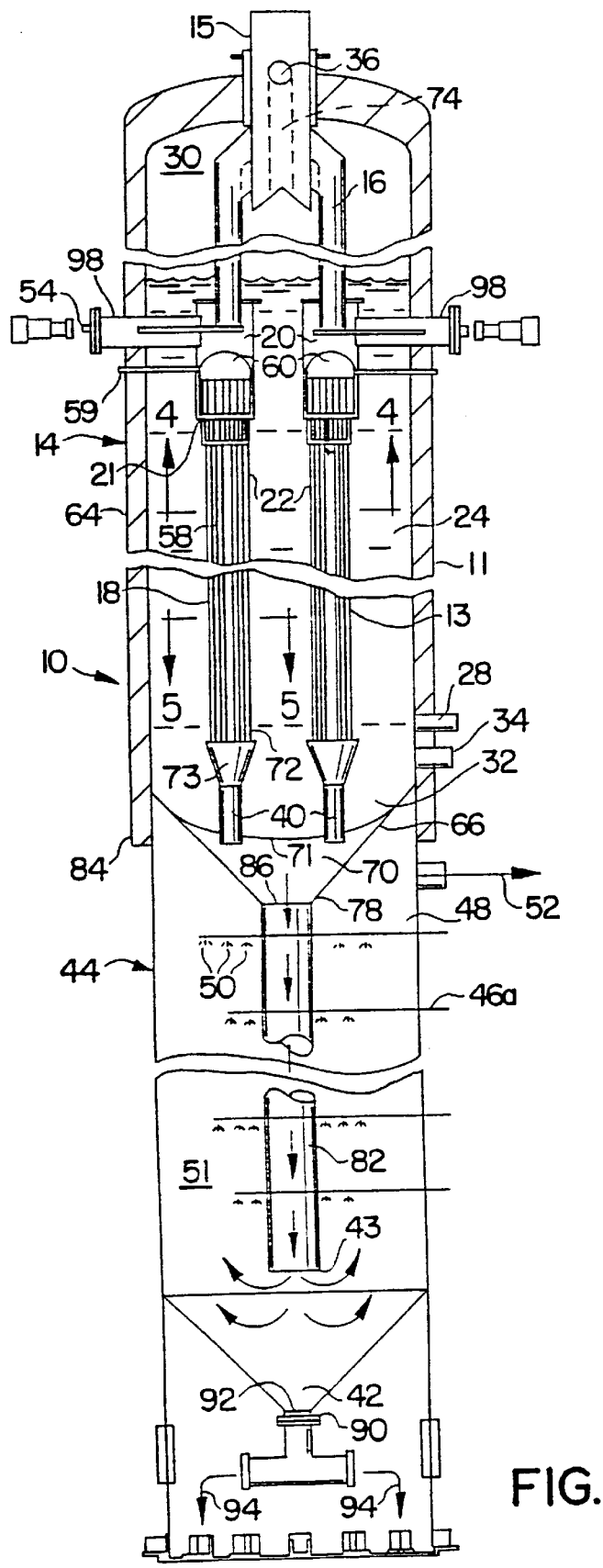
FIG. 2 is a partially broken-away, cross-sectional view of a boiler unit including a direct contact aftercooler for recovering energy from a hot flue gas flow according to the present invention.
Figure 3:
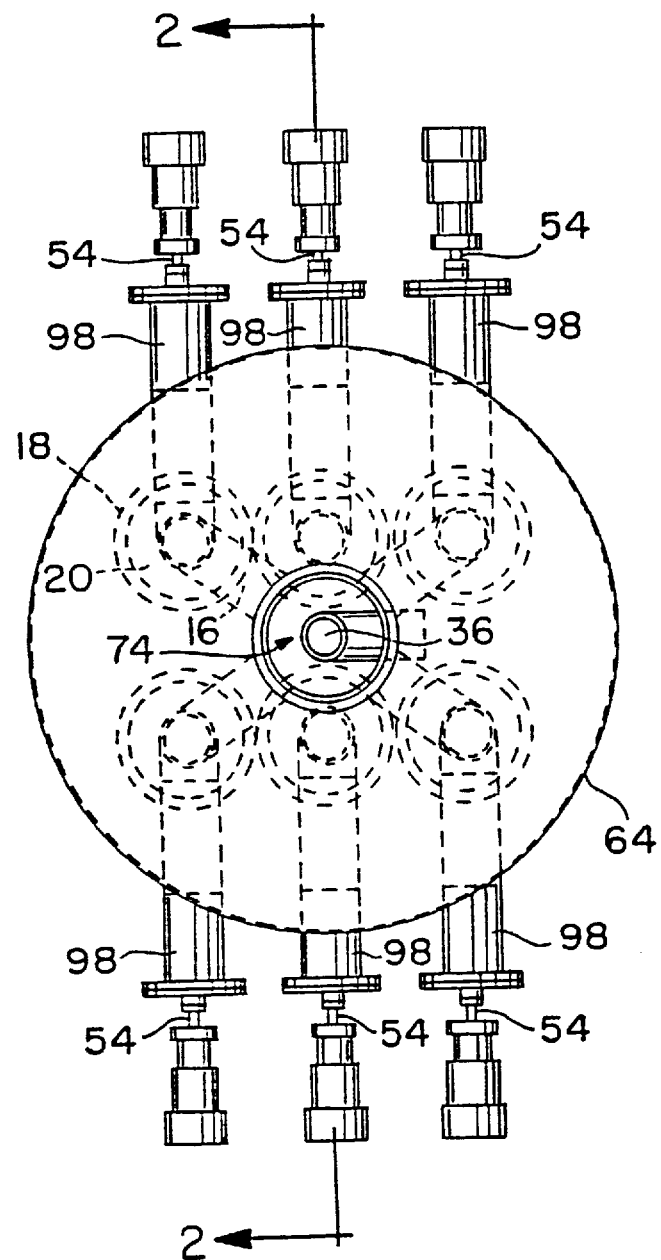
FIG. 3 is a top-plan view of the boiler of FIG. 2.

The preferred design of the apparatus 10 is shown in FIGS. 2–6 and described below. In the Preferred embodiment or the apparatus 10 there are a plurality of heat exchangers 18 in a single boiler 11 which is capable of continuous operation. Preferably there are at least three such heat exchangers 18, and, as shown in the embodiment of FIG. 3, there are six. As shown in FIG. 2, each heat exchanger 18 is positioned at least partially in the water side 24 of the boiler 11. Preferably, all of the heat exchange surface area on the outer tubes 22 of each heat exchanger 18 is located in contact with the water side 24 such that the gas side 13 of the boiler is in full heat exchange relation with water in the water side 24. It will be recognized by one of ordinary skill in the art based on this disclosure that, while not preferred in the present invention, it is within the scope of the invention to reverse the gas side 13 and the water side 24 of the apparatus 10 as shown in FIGS. 2–6 such that each heat exchanger 18 is positioned within the gas side 13 and the water side 24 lies within the heat exchangers 18.

The boiler 11 has an exterior housing 64 and includes a first chamber 14 for generating steam and cooling the hot flue gas flow 12, and a second chamber 44 for purifying and further cooling the cooled flue gas leaving the first chamber 14. A portion of the housing 64 around the first chamber 14 is in the form of an insulated covering. The first chamber 14 is positioned above the second chamber 44 as shown in FIG. 2. This is an economical and practical design for most applications if sufficient vertical space is available. However, one skilled in the art would understand from this disclosure and the flow diagram as shown in FIG. 1, that depending upon the space constraints in a particular location for the apparatus 10, the chambers 14, 44 may be situated side-by-side or separated from one another in order to accommodate other equipment at a particular application site.

A hot flue gas flow 12 which may come from a number or industrial sources including any industrial flue gas or stack gas from, for example, a cement manufacturing kiln, or various types of furnaces such as industrial, steel-making, smelting, coking, electric-arc and plasma-arc furnaces and the like enters a gas side 13 of the first chamber 14 through inlet 15 which branches into individual feed lines 16. The hot flue gas flow 12 then passes through separate gate valve assemblies 17 in the open position into the gas side 13, which is herein configured to include a plurality of heat exchangers 18. The gate valve assemblies 17 each include a gate valve, a pneumatic actuator and a solenoid valve which operates the actuator. Preferably, the pneumatic actuator is a pneumatic piston actuator.

The typical temperatures or a hot flue gas flow 12 leaving such industrial facilities, and which is preferred For economically operating the present invention is preferably from about 1000° F. to about 2000° F., more preferably from about 1500° F. to about 1800° F., although the apparatus 10 can be designed to use flue gas flows 12 having temperatures outside these ranges.

Such industrial flue gas flows, while capable delivering high quantities of readily available heat, also typically include significant quantities of particulate including, for example, cement dust, carbonaceous deposits from burning fuel, silt, metals, and the like. Some particulate may be toxic and/or hazardous to human health such that they must be removed prior to exhausting flue gas to the atmosphere. Others are worth recovering and recycling, such as, for example, precious metals. Some Particulate is easily combustible in further processing. In addition, particulate may be collected and processed in a baghouse or similar facility (not shown). As described above; however, the presence of the particulate in hot flue gas flows presents a problem when attempting to use the heat available from these gas flows as the particulate causes significant fouling of such heat exchangers. In addition, mechanical cleaning of the heat exchange elements of most heat exchangers to remove the fouling requires significant expense in man-hours, materials and down-time.

The hot flue gas flow 12 including particulate is conducted into the gas side 13 through an outer manifold 20 and into the first ends 21 of the outer tubes 22 of the heat exchangers 18. The outer tubes 22 are situated such that they are at least partially in water 26 in the water side 24. Pressurized water 26, Preferably at a temperature of about 200° F. to about 400° F., more preferably about 300° F. to 400° F., and at the corresponding pressure, is continuously introduced through the water side 24 by means for introducing the water such as a conventional feed-water pump 25 as shown in FIG. 1. A drain line 34 may be included in the bottom portion 32 of the water side 24. The water 26 may, for example, be from an in-house source and heated to the preferred operating temperature, recycled from the boiler 11 through an external condenser or taken as recovered water from other areas of the industrial facility or from the nearest such facility. As shown in FIG. 1, steam from the generator 38 is condensed in condenser 27 and fed to the bottom portion 32 of the water side 24. The outer tubes 22 of the heat exchangers 18 are in heat exchange relation with the water 26 in the water side 24 and the water 26 flows freely around and between the outer tubes 22.

The hot flue gas flow 12 is cooled in the gas side 13 and steam is formed and accumulated in the upper portion 30 of the water side 24. The steam is released and conducted through the outlet 36 of the water side 24, which is preferably insulated. The steam passes outwardly through the space 74 in the main hot flue gas inlet 15. The line leading from outlet 36 extends upwards, through the center of the main hot flue gas flow inlet 15, such that the steam passes outwardly in contact with the incoming hot flue gas flow 12 to superheat the steam and to allow some cooling of the hot flue gas flow 12 entering the gas side inlet 15. The outlet 36 is in communication with a power generator 38 or other apparatus for generating power from steam, for example, an electrical generator, turbine or similar apparatus. Preferably, the steam source is fed to a turbine generator which is capable of providing electrical power of typically at least about 100 kW.

The gas side 13 also includes an outlet 78 for releasing cooled flue gas leaving the first chamber 14. The outlet 78 as shown in FIG. 2 is below the heat exchangers 18, and preferably below the water side 24, in a particulate collection area 70. One skilled in the art will recognize from this disclosure that the outlet 78 may be situated anywhere below the water side 24 such that the cooled flue gas is fed through the particulate collection area 70. Particulate entrained in the cooled flue gas and particulate removed from the heat exchangers 18 can collect in area 70 and be transported to the bottom 42 of the apparatus 10.

The outlet 78 is in fluid communication with the inlet 43 of the second, or particulate purification and final cooling, chamber 44, hereinafter referred to as the direct contact aftercooler (DCA) 44. The outlet 78, as shown, is connected to the inlet 43 of the DCA 44 by a pipe 82 extending longitudinally downward through the DCA 44. However, the pipe 82 may also extend outwardly through the boiler housing 64, along its exterior and re-enter into the DCA 44.

As shown in FIG. 2, the bottom surface 66 of the particulate collection area 70 is preferably generally funnel-shaped to facilitate removal of particulate from the heat exchangers 18. While a funnel-shaped wall 66 is preferred, other configurations for the wall 66 may be used within the spirit of the invention, including generally spherical or planar. However, it is preferred that the wall 66 be funnel-shaped to allow for particulate to be conducted more easily to the bottom 42 of the apparatus 10. Preferably, the outlet 78 is located at the mouth 86 of a funnel-shaped dividing wall 66 as shown in FIG. 2.

The cooled flue gas leaves the outer tubes 22 of the heat exchangers 18 at a temperature of from about 350° F. to about 450° F., preferably from about 375° F. to 425° F. The cooled flue gas is conducted through lines 40 to inlet 43. The cooled flue gas is conducted through the inlet 43, which, as shown in FIG. 2, is positioned proximate the bottom portion 42 of the apparatus 10. The cooled flue gas flows upwardly through DCA 44 such that large particulate and water fall to the bottom 42 under the force of gravity. Water is supplied by line 46 to an upper portion 48 of the DCA 44. The water provided to the DCA 44 may be either from an in-house source, from an external chiller (not shown) in communication with the water 26 leaving through drain line 34, recovered from sludge leaving the bottom 42 and recycled to the line 46, or recovered from another location in the industrial facility using the present invention and chilled by an external chiller (not shown).

Line 46 preferably branches into rows of lines 46a which are provided with a plurality of spray nozzles, preferably hollow cone sprinkler heads 50, provided to the rows of lines 46a in a staggered fashion to maximize contact between the cooled flue gas and the fine mist provided by the sprinklers 50 in the interior space 51 of the DCA 44. The mist mechanically scrubs remaining fine particulate from the cooled flue gas precipitating the particulate and further cooling the flue gas to a temperature of from about 60° F. to about 100° F., preferably from about 70° F. to 90° F. The cooled, scrubbed flue gas is removed from the upper portion 48 through the first outlet 52 of the DCA, which is preferably above the inlet 43. Further filtration or purification devices, if any, could be connected at this point if there were other specific contaminants which were not removable by using the apparatus 10, or if the contaminant load were unusually large. However, for most applications, the flue gas leaving the outlet 52 is contaminant free and cooled to a preferred temperature range of from about 70° F. to about 90° F.

Particulate leaving the heat exchangers 18, and fine particulate and water removed by the mist in the DCA, are collected and removed from a second outlet 90 of the DCA 44 at the bottom 42 as sludge. The sludge is then preferably sent for further downstream processing including separation of water and particulate in a filter press or similar separation apparatus. The water may be recirculated to the DCA, used elsewhere in the industrial facility, or sent to a drain. The bottoms of the separation, in the form of a particulate slurry, can then be transported, for example, by pipe to a cooling tower and baghouse for disposal.

The bottom 42 is preferably frusto-conical in shape such that the outlet 90 is positioned at the mouth 92 of the frusto-conical apparatus bottom 42. However, other shapes for the bottom 42, including, for example, generally spherical, planar and pyramidal are also suitable alternatives. It is preferred that the bottom 42 has at least one portion of its surface which is sloped to facilitate collection of particulate sludge above the outlet 90.

Preferably, the particulate sludge is continuously removed by lines 94 and taken for further processing as described above.

The apparatus 10 also includes means for periodically injecting an inert gas into the gas side 13 of the first chamber 14 for removing particulate fouling on the gas side 13. The inert gas is preferably steam, however, if steam acts adversely with respect to the flue gas or entrance particulate, or where otherwise cost effective, other inert gases such as carbon dioxide, nitrogen and the like may be substituted for steam. Means for controlling the injection of such inert gas and means for controlling the flow of hot flue gas into the inlet 15 are also provided. The means for controlling the flow of hot flue gas alternatively stops the flow of the flue gas to the gas side 13 when the heat exchange relation falls below a predetermined minimum, as described below, as a result of such particulate fouling.

To remove particulate which fouls the heat exchangers 18, the hot flue gas flow 12 is stopped by the flow controlling means when the heat exchange relation Q for a heat exchanger 18 is less than a predetermined minimum heat exchange capacity $Q_{min}$. The heat exchange relation Q is a function of the change in the temperature $\Delta T$ of the hot flue gas flow 12 over the length of the heat exchangers 16. As a result, the temperature $T_1$ of the incoming hot flue gas flow 12 and the desired temperature $T_2$ of the cooled flue gas leaving each of the heat exchangers 12 are monitored by two temperatures sensors 53', including thermocouples, which are connected to a temperature monitor 53 on each heat exchanger 18. As shown, 53 and 53' are pressure taps to determine fouling, and thermocouples can be located at the same place as the taps. The monitors 53 of the heat exchangers 18 are all preferably connected to a main distribution bus of a central processing unit (CPU). The CPU may be any suitable computer processing device which includes random access and non-volatile memory capacity. The CPU is preferably connected to a display terminal, and a keyboard for input of set points and programming information. A printer may optionally be provided as well as a telephone connection and modem if the CPU is to be connected to a remote CPU or a central operating network.

An acceptable maximum exit temperature $T_{2max}$ is used as a set-point for taking a heat exchanger off-line for a given hot flue gas flow temperature $T_1$. The particular set-point is calculated based upon predetermined values of a minimum heat exchange capacity $Q_{min}$ and a given entering $T_1$. This value must be calculated initially with general thermodynamic equations based upon the design parameters of the heat exchangers, the temperature $T_1$ of the industrial flue gas flow 12 to be introduced and the quantity of steam power to be generated. One skilled in the art will recognize from this disclosure that such parameters as the material of construction of the heat exchangers 18 and the heat exchange surface area provided for each of the heat exchangers 18 should be taken account in determining this value.

The heat exchange constant $c_p$ for the material of the heat exchangers 18, the volumetric flow rate and entering temperature $T_1$ of the flue gas 12 and the minimum heat exchange capacity $Q_{min}$ selected can be programmed into the CPU for calculation of the temperature set-point $T_{2max}$. Once this value is determined, the CPU can compare the actual monitored $T_2$ to the preset value of $T_{2max}$ to determine when to stop the flue gas flow and inject steam or other inert gas.

As the temperature $T_2$ of the gas leaving a particular heat exchanger 18 increases, the heat exchange capacity Q decreases, therefore, when $T_2$ reaches $T_{2max}$, the minimum heat exchange capacity $Q_{min}$ has also been reached.

As confirmation, preferably, the change in pressure $\Delta P$ over the length of the heat exchanger 18 is also monitored such that when the change in pressure $\Delta P$ exceeds a predetermined maximum allowable pressure drop $\Delta P_{max}$, it functions as a second set point and indicator that the outer tubes 22 of the heat exchanger 18 have become excessively fouled with particulate. An average maximum pressure drop may be determined for each piece of equipment as used in a particular application by first determining the $Q_{min}$ for that particular application and measuring the pressure drop which occurs when the $Q_{min}$ is reached. An average pressure drop may then be calculated and acts as a second set-point to determine when the $Q_{min}$ has been reached. As such, $\Delta P_{max}$ may function as a failsafe indicator in the event of a failure of the temperature sensors 53.

Once the $T_{2max}$ set point has been reached for a particular heat exchanger 18, the CPU will send a signal to the valve assembly 17 preceding that heat exchanger 18 and the solenoid will actuate the pneumatic actuator in the valve assembly 17 to close the gate valve and thereby stop the hot flue gas flow 12 to the heat exchanger 18 taking only that heat exchanger 18 off-line.

Once a heat exchanger 18 is off-line, a second signal is sent by the CPU to open a corresponding gate valve assembly 54 in line 56 controlling the steam or other inert gas flow into the off-line heat exchanger 18. The gate valve assemblies 54 are preferably of the same valve construction as the gate valve assemblies 17. If steam is used, a portion of the steam formed in the water side 24 released through outlet 36 is split into line 56 leading to valve assembly 54. The superheated steam from the water side 24, or from an external source, or other inert gas, is injected into the gas side 13 of the boiler 71, through inner tubes 58 of the heat exchangers 18, by injecting the steam or gas through injection port 59 into the inner manifold 60 situated within outer manifold 20. The injection port 59 may be any suitable steam injection port including, for example, a narrow nozzle for increasing the steam or gas velocity, a venturi valve in connection with a nozzle for increasing pressure, velocity and for providing turbulence, a mixing nozzle to add other gases and the like.

Figure 4:
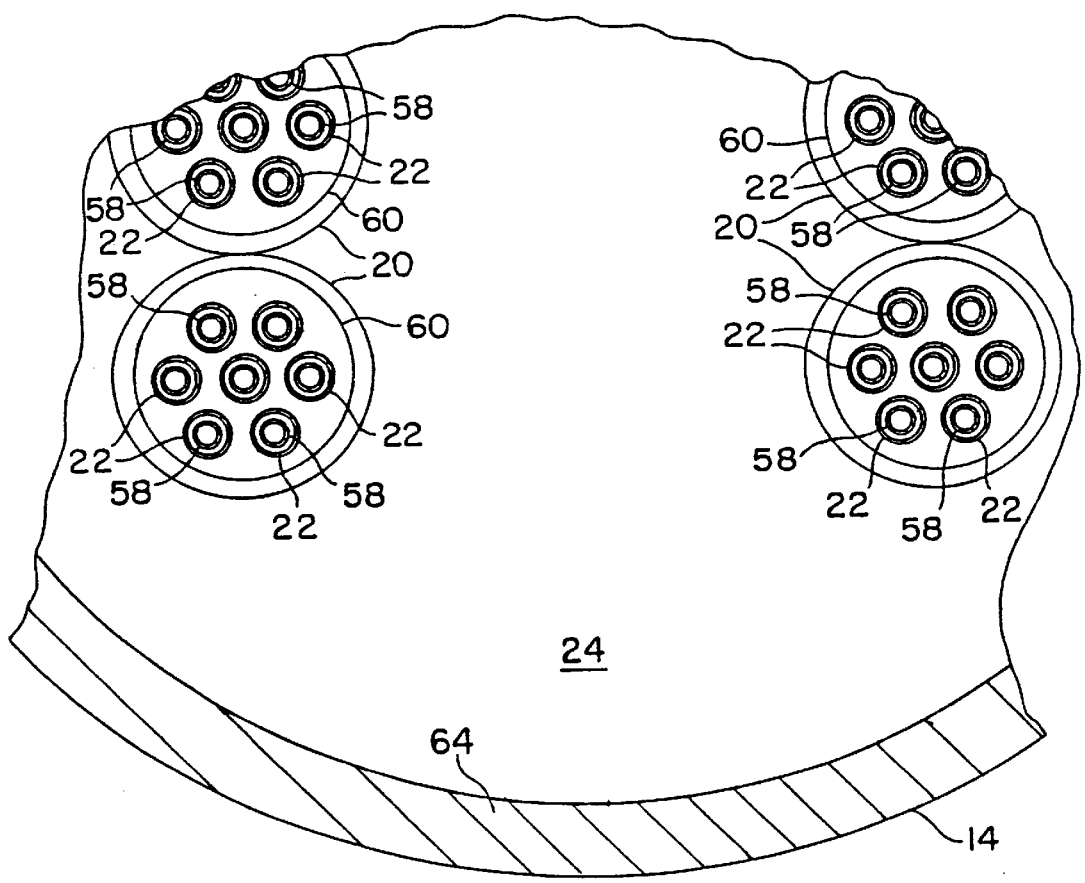
FIG. 4 is a cross-sectional view of several of the heat exchangers within the boiler of FIG. 2 taken along line 4—4.
Figure 5:
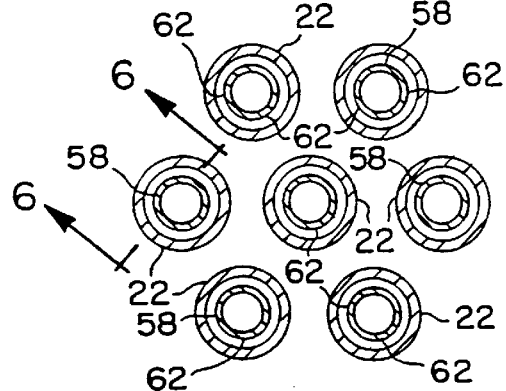
FIG. 5 is a cross-sectional view of several of the heat exchangers of the boiler of FIG. 2 taken along line 5—5.
Figure 6:
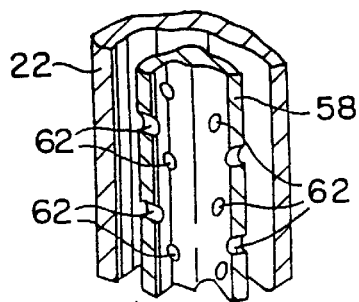
FIG. 6 is a cross-sectional view of the inner and outer tubes of one of the heat exchanger tubes of FIG. 5 taken along line 6—6.

As best shown in FIGS. 4–6, inner tubes 58 are located concentrically within the outer tubes 22, which are spaced apart and arranged in an optimal configuration. The steam or other inert gas passes downwardly at high pressure through the inner tubes 58 which extend at least partially through the outer tubes 22. The steam or other inert gas passes outwardly through a plurality of apertures 62 in the portion of the inner tubes 58 within the outer tubes 22, thereby removing particulate from the inner tubes 58 and the outer tubes 22 by blowing the particulate off of the tubes 22, 58. The apertures 62 extend radially outwardly through the inner tubes 58 as shown in FIGS. 4–6. It will be understood by one skilled in the art based on this disclosure that the number of apertures and the dimension of the apertures 62 can be varied dependent upon the heat exchange capacity required for a particular application. For example, if a high heat exchange capacity is required, for example, due to very high temperature hot flue gas flow, the size of the apertures 62 can be made small and/or the number of apertures 62 decreased to maximize heat exchange area. In addition, if the particulate load is high in a particular application, the number and/or size of the apertures 62 can be increased for better particulate fouling removal The particulate falls downwardly, preferably to the particulate collection area 70. The particulate collection area 70 is preferably separated from the water side 24 of the first chamber by a bottom surface 71. The bottom surface is preferably curved as shown in FIG. 2.

The outer manifold 20 functions to house the inner manifold 60 and to prevent water from entering the interior of the outer tubes 22. The outer manifold 20 of each heat exchanger 18 preferably includes an extension 98 through the boiler housing 64 which houses valve assembly 54. However, the valve assembly 54 may be positioned outside the extension 98 without departing from the spirit of the invention. The bottom surface or each manifold 20 holds the outer tubes 22 of the heat exchangers 18 in position and may be formed from any suitable tube sheet. The inner manifold 60 is preferably formed of an exterior pipe cap or similar component connected to a tube sheet forming the bottom surface of the inner manifold 60.

The inner manifold 60 is preferably connected to the injection port 59 such that the injection port 59 extends outwardly from the inner manifold 60 in a transverse direction through the boiler 11. The manifolds 20, 60 further function to hold the inner tubes 58 within the outer tubes 22 as shown in FIGS. 2 and 4.

The second ends at the bottom portion of the inner tubes 58 terminate within the outer tubes 22; however, the second ends of the inner tubes 58 may be coterminous with the second ends 72 of the outer tubes 22 or extend beyond the second ends 72 within the scope of this invention. Further, the second ends of the inner tubes 58 may have openings or be closed by solid surfaces extending transversely across the ends. The second ends 72 of the outer tubes 22 are configured for releasing cooled flue gas outside the water side 24

As shown in FIG. 2, the second ends 72 terminate within an end piece 73. Each end piece 73 preferably includes a tube sheet as an upper surface for holding the second ends 72 in alignment with the first ends 21 of the outer tubes 22, and for sealing the second ends 72 to prevent water from entering the outer tubes 22. The end piece 73 preferably has a sloped surface to facilitate the removal or particulate blown from the heat exchangers 18 by steam. More preferably, the end pieces 73 are funnel-shaped having lines 40 extending downwardly therefrom, the pipes or ducts preferably providing communication between the end pieces 73 and the particulate collection area 70, and direct the cooled flue gas leaving the outer tubes 22 of the heat exchanger 18 into the particulate collection area 70. Alternatively, the lines 40 could lead directly from the water side 24 to the bottom 42 of the apparatus 10 such that particulate is dropped directly down to the second outlet 90 of the DCA 44.

The injection process for removing fouling from the gas side 13 preferably continues for a period of time t until the value of $T_2$ is below the value of $T_{2max}$. The time t must be determined initially in a given application of the apparatus 10 by calculating an average time for de-fouling the heat exchangers 18 such that $T_2$ is again at a level below the set point. Once the average value of the time t is determined, it is entered into the CPU as the set point for determining when the heat exchangers 18 are brought back on-line. The value of time t in a given application can be varied. Preferably, the CPU is further programmed and the set-points $T_{2max}$ and time t are entered such that no more than one heat exchanger 18 is off-line at any time and the apparatus 10 may continuously operate. However, if there is only one heat exchanger 18, the apparatus 10 may also be used on a non-continuous basis.

Referring now to the method of the present invention, there is shown in FIG. 1 a schematic diagram of the preferred method of operation of the apparatus for purifying and recovering energy from hot flue gas.

Particulate-containing hot flue gas is flowed through inlet 15 of the gas side 13 of a boiler 11. The boiler also has a water side 24 in heat exchange relation as described above. The hot flue gas is cooled on the gas side 13 while water is heated and steam is simultaneously produced on the water side 24. The steam is conducted to a power generator 38 such as those described above. Preferably, the gas side 13 and the water side 24 of the boiler are configured as a plurality of heat exchangers connected in parallel.

Cooled flue gas is conducted to a purification chamber 44 corresponding to the DCA 44 having water spray nozzles for removing fine particulate from the flue gas. The spray nozzles may be the same as the spray nozzles 50. The scrubbed flue gas is removed from an upper portion 48 of the purification chamber 44 and particulate is removed from a low portion 42 of the chamber 44 in the manner described above with respect to the apparatus 10.

The flue gas flow 12 to the gas side 13 is stopped when the heat exchange relation drops below a predetermined minimum heat exchange capacity $Q_{min}$, that is exceeds the value of set point $T_{2max}$ as described above, due to particulate fouling. Steam, or other inert gas, is injected to the gas side through injection port 59 after stopping the flow of hot flue gas to remove the particulate fouling from the gas side 13. Preferably, the inert gas is steam taken from the steam produced in the water side 24 of the boiler. The particulate fouling is preferably conducted through the lower portion 42 of the purification chamber 44 for removal with the particulate scrubbed from the cooled flue gas by the spray nozzles 50. The injection of steam or other inert gas is terminated after a period of time sufficient for the exit temperature of the heat exchanger 18 which is off-line to again fall below the set point temperature such that the minimum heat exchange capacity $Q_{min}$ is exceeded. The time t is determined as an average time t calculated initially as described above. Preferably, the stopping of the hot flue gas flow, injection of steam or other inert gas and restarting of the hot flue gas flow are done continuously and alternatively on each of a plurality of heat exchangers 18 so that the hot flue gas flow is continuous through at least one of the heat exchangers to provide a constant steam supply to the power generator 38.

The invention will now be described in more detail with respect to the following specific, non-limiting example:

EXAMPLE I

Hot flue gas at a temperature of 1700° F. and 14.7 psia at a flow rate of $6 \times 10^5$ std. ft$^3$/hr. was fed into the inlet to an upper chamber of a boiler unit having six parallel heat exchangers. The hot flue gas flow was taken from a copper-smelting furnace and included, in volume percent, 76% nitrogen and argon, 10% oxygen, and 14% carbon dioxide. The gas carried a particulate load of 416.67 lb$_m$/hr. Warm recovered water from ocher areas of the copper-smelting facility was fed to the inlet of the water side of the first chamber of the boiler. Each heat exchanger had 7 pairs of inner and outer tubes extending from the inner and outer manifolds. The tubes were formed of 304 SS stainless steel. The outer tubes were 30 feet in length and 2.375 inches OD. The inner tubes were 28 feet in length and 0.75 inches OD. The apertures in the inner tubes were 0.125 inches in diameter and were spaced in a staggered manner about 8 inches apart over the length of the inner tubes. The water level and steam pressure were monitored by a steam pressure gauge connected to a water level control which were both monitored and controlled by the CPU. The CPU was a ABB MODCELL.

Superheated steam was removed from the top or the boiler and partially recirculated through steam injection ports to off-line heat exchangers in an alternating manner for removing particulate. The remaining steam in the main stream leaving the boiler and generated in the water side of the boiler was removed and directed to a turbine generator for generating 300 KW of electricity.

The temperature of the hot flue gas flow into the boiler and leaving the heat exchangers was detected by thermocouples connected to a monitor which was connected to the CPU. The minimum heat exchange capacity for the heat exchangers was determined based upon the size of the heat exchange area, the incoming temperature of the hot flue gas flow and the heat capacity of the stainless steel tubes. From these values, a $T_{2max}$ set point for the heat exchangers was determined to be 400° F., and that value was entered into the CPU. The maximum exit temperature set point functioned for determining when the heat exchangers were to be taken off-line. An average time t for sufficiently de-fouling the heat exchangers was determined by several start-up runs and calculated to be 5 minutes. The time t was entered into the CPU and used to determine when to return the heat exchangers to on-line operation. Once the set points were entered, the unit functioned automatically. The CPU was also connected to the steam valve and hot flue gas flow valve assemblies. Each valve assembly included a gate valve, a pneumatic piston actuator and a solenoid which operates the actuator. On start up runs, the average on-line operating time for each heat exchanger when using this particular hot flue gas flow was calculated to be 35 minutes, and the average time period for steam purging of off-line heat exchangers to restore the heat exchanger to the operating heat capacity (having a $T_2$ of between about below 400° F.) was calculated based on the start-up runs to be 5 minutes. The off-line time was entered into the CPU and used to determine when to place the heat exchangers on-line and the unit functioned automatically once the temperature set point and the off-line time were entered into the CPU.

The cooled flue gas was fed to the bottom of a DCA having six rows of staggered hollow cone sprinklers. The cooled, purified flue gas was removed from the top of the DCA and further cooled by an external heat exchanger to 100° F. and exhausted to the atmosphere. Wastewater and particulate in the form of a sludge were removed from a bottom conical portion of the DCA and transported by pipe for further processing including separation of particulate and water in a filter press. The recovered water was chilled and recirculated to the top of the DCA. The particulate slurry was further cooled and sent to a baghouse for disposal.

The conditions of the water fed to the boiler, the flue gas at various locations within the apparatus, the cooling water to the DCA and the recirculating steam were as shown below in Table I.

TABLE I

| Location | Press. (psia) | Temp. (°F.) | Flowrate (scfh) | $N_2$ & Ar (Vol %) | $O_2$ (Vol %) | $CO_2$ (Vol %) | Part. ($lb_m/h$) | Water ($lb_m/h$) |
|---|---|---|---|---|---|---|---|---|
| boiler inlet | 14.7 | 1700 | $6.00 \times 10^5$ | 76.00 | 10.00 | 14.00 | 416.67 | 7867.20 |
| heat exchanger outlet | 13.7 | 450 | $6.00 \times 10^5$ | 76.00 | 10.00 | 14.00 | 416.67 | 7867.20 |
| Steam In Boiler | 150 | 358.48 | — | — | — | — | — | $2.38 \times 10^4$ |
| Water Into Boiler | 24.7 | 240 | — | — | — | - | — | $2.38 \times 10^4$ |
| Steam To Turbine | 150 | 358.48 | — | — | — | — | — | $2.00 \times 10^4$ |
| Cooled Purified Flue Gas Leaving DCA | 12.7 | 90 | $6.00 \times 10^5$ | 76.00 | 10.00 | 14.00 | 10.00 | $8.94 \times 10^2$ |
| Water and Particulate from DCA | 14.7 | 120 | — | — | — | — | 406.67 | $3.82 \times 10^5$ |
| Water into DCA | 40.0 | 85 | — | — | — | — | — | $3.75 \times 10^5$ |

As can be seen from the experimental conditions of the cooled, purified flue gas leaving the DCA, significant quantities of particulate were removed in the DCA in the form of a slurry. In addition, the device successfully transferred the steam necessary to continuously generate power in a turbine generator in another area of an industrial facility. The process of energy recovery required no down-time for de-fouling of heat exchangers and was conducted continuously such that steam was delivered without interruption to the turbine generator. No additional chemical agents or additional man-hours were required for the apparatus for heat exchanger de-fouling or heat exchanger element replacement. The apparatus was fully automated once on-line requiring only ordinary supervision and maintenance.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for purifying a hot flue gas flow and for recovering thermal energy from a hot flue gas flow, comprising the steps of:

(a) flowing particulate-containing hot flue gas into a boiler having a gas side and a water side in heat exchange relation;

(b) simultaneously cooling the flue gas in the gas side and heating water in the water side to produce steam;

(c) conducting the steam to a power generator;

(d) conducting cooled flue gas to a purification chamber having spray nozzles for removing fine particulate from the flue gas;

(e) scrubbing the cooled flue gas in countercurrent flow with water from the spray nozzles;

(f) removing scrubbed flue gas from an upper portion of the purification chamber;

(g) removing particulate from a lower portion of the purification chamber;

(h) stopping the flow of hot flue gas to the gas side when the heat exchange relation drops below a predetermined minimum heat exchange capacity due to particulate fouling;

(i) injecting an inert gas into the gas side after stopping the flow of hot flue gas to remove the particulate fouling; and (j) terminating the injection of the inert gas and restarting the flow of hot flue gas to the gas side after a predetermined period of time sufficient for the heat exchange relation to exceed the predetermined minimum heat exchange capacity.

2. The method according to claim 1, wherein the injected inert gas of step (i) is the steam which is produced in step (b).

3. The method according to claim 1, wherein the particulate fouling removed in step (i) is conducted through the lower portion of the purification chamber for removal with the particulate scrubbed from the cooled flue gas.

4. The method according to claim 1, wherein the gas side and water side of the boiler are configured as a plurality of heat exchangers connected in parallel, and steps (h), (i) and (j) are carried out alternatively on the heat exchangers so that hot flue gas is always flowing through at least one of the heat exchangers.

* * * * *

UNITED STATES PATENT AND TRADEMARK OFFICE
CERTIFICATE OF CORRECTION

PATENT NO. : 5,840,100
DATED : November 24, 1998
INVENTOR(S) : José P. Arencibia, Jr.

PAGE 1 OF 2

It is certified that error appears in the above-identified patent and that said Letters Patent is hereby corrected as shown below:

Column 1, line 49, delete "50°F" and substitute therefor -- 500°F --.

Column 3, line 64, delete the word "of-line" and substitute therefor -- off-line --.

Column 4, line 34, delete the word "or" and substitute therefor -- of --.

Column 4, line 55, after capable insert -- of --.

Column 7, line 21, delete the numeral "16" and substitute therefor -- 18 --.

Column 8, line 31, delete the numeral "71" and substitute therefor -- 11 --.

UNITED STATES PATENT AND TRADEMARK OFFICE
CERTIFICATE OF CORRECTION

PATENT NO. : 5,840,100
DATED : November 24, 1998
INVENTOR(S) : José P. Arencibia, Jr.

It is certified that error appears in the above-identified patent and that said Letters Patent is hereby corrected as shown below:

Column 9, line 8, delete the word "or" and substitute therefor -- of --.

Column 10, line 16, delete the word "low" and substitute therefor -- lower --.

Column 10, line 54, delete the word "ocher" and substitute therefor -- other --.

Column 11, line 1, delete the word "or" and substitute therefor -- of --.

Signed and Sealed this

Eighteenth Day of May, 1999

Attest:

Q. TODD DICKINSON

Attesting Officer

Acting Commissioner of Patents and Trademarks